(12) United States Patent
Sprangle et al.

(10) Patent No.: US 8,108,614 B2
(45) Date of Patent: Jan. 31, 2012

(54) MECHANISM FOR EFFECTIVELY CACHING STREAMING AND NON-STREAMING DATA PATTERNS

(76) Inventors: Eric Sprangle, Austin, TX (US); Anwar Rohillah, Austin, TX (US); Robert Cavin, Palo Alto, CA (US)

( * ) Notice: Subject to any disclaimer, the term of this patent is extended or adjusted under 35 U.S.C. 154(b) by 486 days.

(21) Appl. No.: 11/967,413

(22) Filed: Dec. 31, 2007

(65) Prior Publication Data

US 2009/0172291 A1    Jul. 2, 2009

(51) Int. Cl.
*G06F 12/12* (2006.01)

(52) U.S. Cl. .................. 711/134; 711/136; 711/E12.07; 711/E12.071

(58) Field of Classification Search ........................ None
See application file for complete search history.

(56) References Cited

U.S. PATENT DOCUMENTS

| | | | |
|---|---|---|---|
| 6,012,134 A | 1/2000 | McInerney et al. | |
| 6,202,129 B1 * | 3/2001 | Palanca et al. | 711/133 |
| 6,205,520 B1 * | 3/2001 | Palanca et al. | 711/138 |
| 6,223,258 B1 * | 4/2001 | Palanca et al. | 711/138 |
| 6,226,715 B1 * | 5/2001 | Van Der Wolf et al. | 711/133 |
| 6,487,637 B1 * | 11/2002 | Arimilli et al. | 711/133 |
| 6,584,547 B2 * | 6/2003 | Palanca et al. | 711/133 |
| 6,785,784 B1 | 8/2004 | Jing | |
| 6,823,428 B2 * | 11/2004 | Rodriguez et al. | 711/136 |
| 7,017,008 B2 | 3/2006 | Fanning | |
| 7,100,155 B1 | 8/2006 | Wu | |
| 7,360,015 B2 | 4/2008 | Matthews | |
| 2003/0217230 A1 * | 11/2003 | Rodriguez et al. | 711/136 |
| 2007/0150653 A1 * | 6/2007 | Cooray et al. | 711/118 |
| 2008/0244080 A1 | 10/2008 | James | |

OTHER PUBLICATIONS

U.S. Appl. No. 10/358,618, filed Feb. 5, 2003, to S. Radhakrishnan.

* cited by examiner

*Primary Examiner* — Kevin Verbrugge
(74) *Attorney, Agent, or Firm* — David P. McAbee

(57) ABSTRACT

A method and apparatus for efficiently caching streaming and non-streaming data is described herein. Software, such as a compiler, identifies last use streaming instructions/operations that are the last instruction/operation to access streaming data for a number of instructions or an amount of time. As a result of performing an access to a cache line for a last use instruction/operation, the cache line is updated to a streaming data no longer needed (SDN) state. When control logic is to determine a cache line to be replaced, a modified Least Recently Used (LRU) algorithm is biased to select SDN state lines first to replace no longer needed streaming data.

10 Claims, 5 Drawing Sheets

MECHANISM FOR EFFECTIVELY CACHING STREAMING AND NON-STREAMING DATA PATTERNS

FIELD

This invention relates to the field of cache memories and, in particular, to efficient caching of streaming and non-streaming data.

BACKGROUND

Typically, cache memory includes memory between a shared system memory and execution units of a processor to hold information in a closer proximity to the execution units of the processor. In addition, cache is typically smaller in size than a shared main system memory, which allows for more expensive faster memory, such as Static Random Access Memory (SRAM). Both the proximity to the execution units and the speed allow for caches to provide faster access to data and instructions. Caches are often identified based on their proximity from execution units of a processor. For example, a first-level (L1) cache may be close to execution units residing on the same physical processor. Due to the proximity and placement, first level cache is often the smallest and quickest cache. A computer system may also hold higher-level or further out caches, such as a second level cache, which may also reside on the processor but be placed between the first level cache and main memory, and a third level cache, which may be placed on the processor or elsewhere in the computer system, such as at a controller hub, between the second level cache and main memory.

As the graphics and media applications become more prevalent, the strain on processors to access data/instructions quickly to ensure a user experience is not interrupted becomes increasingly important. However, streaming data, i.e. data that is accessed a limited number of times, associated with graphic intensive media applications is provided to a processor in a similar manner, i.e. through a cache hierarchy. Yet, frequent replacement of non-streaming data in a cache with streaming data potentially results in adverse performance impacts on non-streaming applications, because some of the non-streaming data will be used in the future, while the cache instead holds streaming data that is not going to be used in the near future (if ever) and is therefore much less valuable to hold in the cache

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific cache implementations and number of ways, specific cache replacement algorithms, specific replacement fields, specific software/compiler to identify streaming instructions etc. in order to provide a thorough understanding of the present invention. It will be apparent, however, to one skilled in the art that these specific details need not be employed to practice the present invention. In other instances, well known components or methods, such as compiler methods for identifying streaming data, specific cache control and replacement logic, Least Recently Used (LRU) replacement algorithm detail, and other specific operation details, have not been described in detail in order to avoid unnecessarily obscuring the present invention.

The method and apparatus described herein are for efficiently caching streaming and non-streaming data. Specifically, efficient caching is primarily discussed in reference to traditional set based cache memories utilizing a Least Recently Used cache replacement algorithm. However, the methods and apparatus for caching streaming and non-streaming data are not so limited, as they may be implemented on or in association with any known cache memory that implements any known replacement algorithm.

Figure 1:
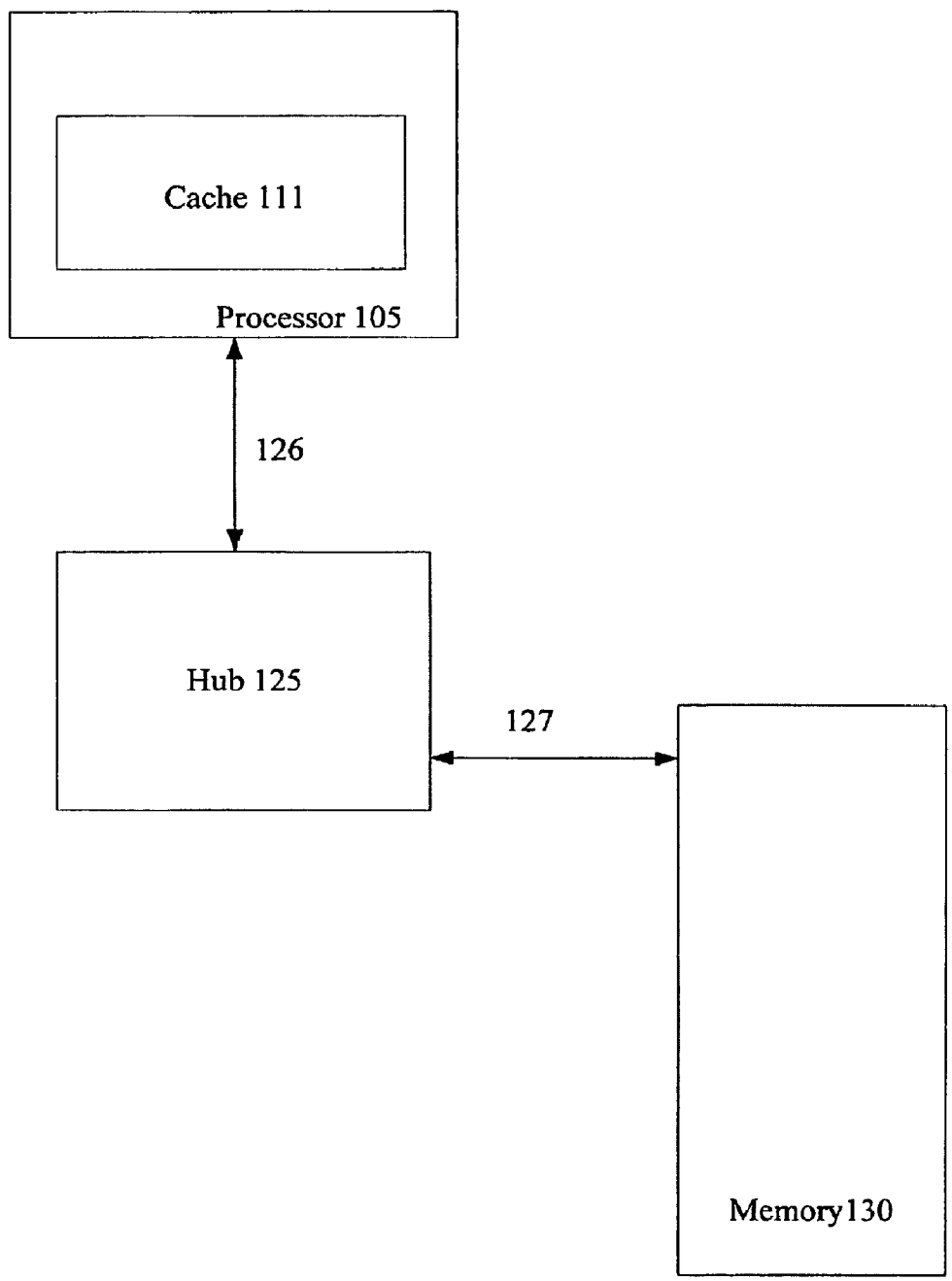
FIG. 1 illustrates an embodiment of a computer system including a processor having a cache memory capable of efficiently caching streaming and non-streaming data.

Referring to FIG. 1, an embodiment of a computer system including a cache memory to efficiently cache streaming and non-streaming data is illustrated. As illustrated, a portion of a traditional multi-processor system is depicted. However, the efficient caching described herein may be utilized in any system, such as single processor computer systems, servers, embedded systems, mobile systems, and other systems having multiple electrical agents. As an example, efficient caching, as described herein, is implemented in a throughput oriented processor system targeted at higher performance throughput workload processing. There are many throughput oriented workloads, such as 3D graphics workloads, media workloads (image/video processing), and scientific workloads Memory 130, as illustrated in FIG. 1 includes a system memory, to hold code, data, and other information to be accessed during runtime. As an example, memory 130 holds streaming applications, when executed, to access large quantities of data in a streaming manner. Examples of system memory include dynamic random access memory (DRAM). However, any memory may be utilized for system memory, such as double data rate (DDR) memory, synchronous dynamic RAM (SDRAM), buffered memory, and other known memory devices. Additionally, memory 130 is not limited to a system memory, and may include other known memory devices, such as a flash memory device.

In one embodiment, hub 125 resembles a chipset. Often a chipset comprises two integrated circuit devices, such as a memory controller hub (MCH) and an interconnect controller hub (ICH). However, hub 125 may include any integrated circuit for facilitating communication between processors and other system devices. Often, Input/Output (I/O) devices are coupled to the ICH. Examples of I/O devices include CDROMs, DVD players, network interface cards, graphics cards, audio cards, and other I/O devices. Therefore, as can be seen, streaming data may also be provided from an I/O device through hub 125 to processor 105. For example, a DVD playing in a DVD player streams video information up to processor 105 for decompression/computation. As another example, data is received by a network interface card and provided through hub 125 to processor 105.

Interconnect 126, as illustrated, couples processor 105 to hub 125. Often interconnect 126 is referred to as a Front Side Bus (FSB). Physically, interconnect 126 may utilize a parallel bus, a serial bus, a multi-drop bus, a point-to-point bus, a Gunning Transceiver Logic (GTL) bus, a GTL+bus, a double data rate (DDR) bus, a differential bus, or other known physical layer/implementation of an interconnect. As a specific illustrative embodiment, interconnect 126 includes a high speed serial point-to-point interconnect, which substantially attempts to adhere to Intel's Quickpath cache coherent specification.

Processor 105 is often referred to as a physical processor, but may include any style of processing element, such as a microprocessor, an embedded processor, a multi-core processor, a multi-threaded processor, a graphics processor, a media processor or a signal processor. As discussed in the example above, processor, in one embodiment, includes a media processor capable of high performance stream data processing.

As illustrated, processor 105 includes cache 111 to efficiently cache streaming and non-streaming data. Cache 111 may include any elements, such as a data array, a tag array, cache control logic, replacement logic, etc. As an example, cache 111 is organized as a k-way set associative cache. However, cache 111 may be organized in any known manner, such as a direct map or fully associative cache. Examples of common uses for cache 111 in processor 105 includes a low-level data cache, such as a level-one data cache, a high-level data cache, such as a level two or level three data cache, an instruction cache, a trace cache, or other known processor related cache.

Streaming media often refers to applications that are constantly received, and normally, displayed to a user. As an example, playing a DVD is streamed form the DVD, and displayed to the end user. Another common example of streaming media includes 3D rendering of objects to be displayed to a user. As a result of streaming media, often, data provided by the stream is not re-used, as it is received, displayed to the end user, and typically not utilized again.

Therefore, in one embodiment, streaming data includes any data that may be used for a limited period, such as for a limited amount of time, a limited number of operations, or limited number of cycles. Often this period includes a reasonable foreseeable amount of time or access operations that would result in holding the data in cache until reuse would be inefficient and wasteful use of cache space. For instance, streaming data may include data that is utilized a single time or a few times and then not intended to be used by a specific portion of an application or the entire application. However, in another embodiment, streaming data includes any data that software, such as a compiler, is capable of identifying as data not to be used after a point in an application, such as after an a memory access operation, for a reasonable amount of time or a number of accesses operations. In one embodiment, a hybrid software and hardware implementation is utilized to efficiently identify streaming operations and cache them accordingly.

As an illustrative example, software, such as a compiler, when compiling an application is capable of determining streaming memory access operations, such as loads of streaming data. Furthermore, the compiler is capable of determining a last access streaming operation to access the streaming data, i.e. the point where the data is no longer intended to be utilized. In other words, a compiler is capable of determining if a memory location, such as a cache line, to be accessed in response to an instruction/operation is non-temporal, i.e. likely not needed by the application again for a reasonable amount of time, which may be estimated by a number of intervening instructions that do not reference the data.

In one embodiment, the compiler is capable of identifying last use access operations with an amount of accuracy. For instance, a compiler that is too aggressive may misidentify operations as streaming data, resulting in misidentified data being preemptively replaced in a cache. However, under identification of last use data potentially results in allowing new streaming data to replace data that has already been accessed for the last time.

After the compiler determines last use streaming operations, in addition, the compiler may also be capable of identifying/tagging the last use operation to be recognizable by cache hardware. Consequently, when a cache access, such as a load from a cache line, is performed in response to a last use streaming operation identified by the compiler, then cache 111 is capable of marking the cache line to indicate the cache line holds data no longer needed, i.e. its "last use" has been performed. In one embodiment, cache 111 utilizes a replacement algorithm, such as a Least Recently Used (LRU) algorithm, to select lines for replacement. Note that use of the term LRU may also refer to the modified LRU algorithm discussed below, which is biased towards first selecting lines in a "streaming data no longer" state for replacement.

Therefore, in one embodiment, cache 111 is capable of updating a replacement sate of a cache line to a streaming data no longer needed state (SDN) state. When a line is to be selected for replacement, cache control logic of cache 111 first searches for SDN state lines for replacement before least recently used state lines. In other words, streaming data identified to likely not be used by soon to follow instructions/operations is the first data to be replaced, which results in replacement of streaming data no longer needed as a preference over streaming data and non-streaming data that may still be needed. Consequently, streaming data may still be efficiently cached, while potentially reducing adverse affects of streaming data replacing non-streaming data, by modifying an LRU algorithm to have a replacement bias towards replacing data non longer needed before other Least Recently Used data.

Often, in different architectures, an instruction may include a number of micro-operations, which may potentially be both memory access operations and non-memory access operations. As a result, an operation may include an instruction to access memory, as well as a specific micro-operation that accesses memory. Specific examples of memory access operations include a load, a read, a write, and a store.

Figure 2:
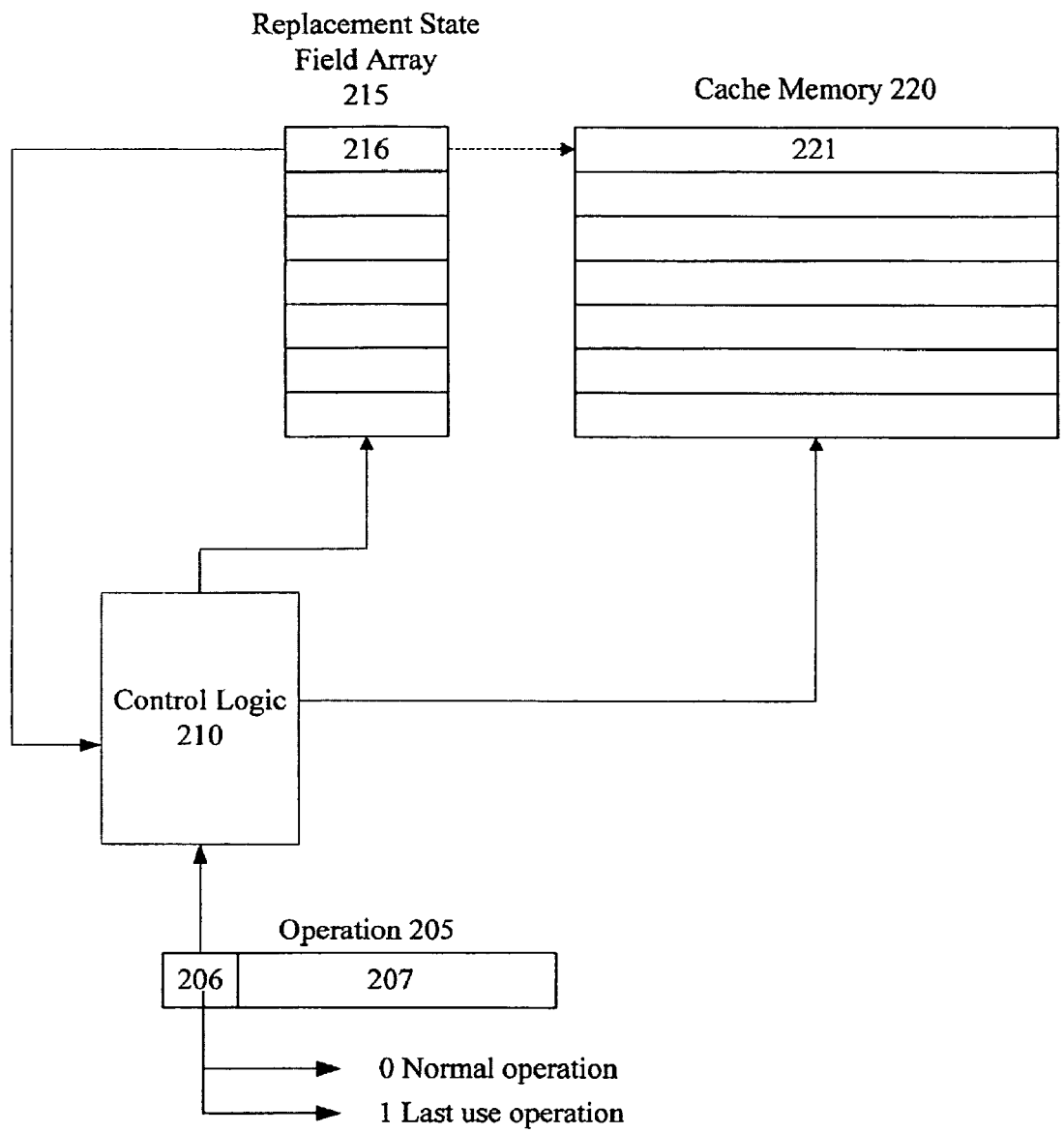
FIG. 2 illustrates an embodiment of hardware to support effective caching of software identified streaming and non-streaming data.

Turning to FIG. 2, an embodiment of hardware to support efficient caching of streaming and non-streaming data is illustrated. Operation 205 includes any memory access operation to access data, such as an operand or instruction, to be held in memory, which may be cached/held in cache memory 220. Note, as discussed above, operation 205 may include an instruction, micro-operation, or other term utilized for executable code to access memory. As illustrated, operation 205 includes a non-temporal field/portion 206, which may also be referred to as a last use field, and other portion 207. Other portion 207 may include any other fields/values normally included in an operation, an instruction, or micro-operation.

In one embodiment, when last use field 206 includes a normal value, operation 205 is determined to be a normal operation. However, when last use field 206 holds a last use streaming value, operation 205 is determined to be a last use operation to access streaming data that is no longer needed, which may also be referred to as a non-temporal streaming operation. In other words, operation 205 is the last streaming operation to access streaming data held in the cache; at least for soon to be executed instructions/operations.

In one embodiment, software, such as a compiler, is to determine if an operation is a non-temporal streaming operation, i.e. a last to use operation. Often a compiler, when executed, is to compile language based code into binary code executable by an architecture, such as binary x86 code to execute on Intel Architecture (IA). In addition, during compilation, compiler code often inserts operations, functions, calls to functions, and other programming constructs to perform tasks, which may be supported by the specific architecture for the compiled code to execute on. Furthermore, compilers often perform optimizations on code, as well as other compiler tasks. These compilers may utilize any style of analysis, such as dependency graphs, control flows, and other known algorithms or analysis tools to effectively and correctly perform compiler tasks. One such task, as described above, potentially includes identifying last use operations, such as non-temporal streaming operations. A programmer may also provide hints, which are also referred to as paramas, to a compiler to identify last use operations.

Here, a compiler, after identifying a last use operation, denotes the last use operation in the compiled application code accordingly. In one embodiment, the compiler inserts a last use value in non-temporal (NT) field to indicate that instruction 205 is a last use operation. A last use value may also be referred to as a non-temporal value or a non-temporal streaming value.

In one embodiment, hardware of processor 200 is capable of recognizing the values of field 206 within instruction 205 and updating a cache replacement state of an associated cache line, accordingly. As illustrated, cache memory 220 includes a plurality of lines, such as line 221 to hold data, which may be streaming or non-streaming data. Replacement state field array 215 includes a plurality of replacement state fields, such as state field 216, associated with lines of cache memory 220, such as line 221. In one embodiment, array 215 is a separate array from cache memory 220. Here, array 215 potentially has a separate access port form cache memory 220 to allow independent accesses to array 215 without having to tie up a port of cache memory 220.

Note that a single way cache, such as a fully associative cache or a direct mapped cache, is illustrated in FIG. 2. However, in one embodiment, a multiple way cache may also be utilized. In fact, quickly referring to FIG. 3, an embodiment of a K-way set associative cache is illustrated. Specifically, eight way cache memory 305 is illustrated, where a set in cache memory 305, such as set 312, includes eight lines, such as lines 312a-h, that are the same offset within each way. In other words, set 312 includes lines 312a-h, which are the first lines in each of the eight ways. Similar to FIG. 2, replacement state field array 310 is associated with cache memory 305. Here, each entry, such as entry 311, includes eight fields, such as fields 311h-311a, to be associated with each of the lines in set 312. Therefore, as can be seen, the discussion below of single way including line 221 that is associated with replacement field 216 in FIG. 2 is analogous to discussing any of the ways in a K-way set associative cache, such as way including line 312d, which is associated with field 311d in FIG. 3.

Returning to FIG. 2, replacement state field 216 is to hold a replacement state for cache memory 220. In an embodiment, where a Least Recently Used (LRU) replacement algorithm is utilized for cache line replacement, a replacement state for a line of cache memory 220 includes a recently used state, a non-recently used state, or levels thereof. However, in one embodiment, the replacement states for an LRU algorithm may further include a streaming data no longer needed (SDN) state. Here, an SDN state may be represented by a streaming data no longer needed (SDN) value held in replacement state field 216 indicating that cache line 221 currently holds streaming data that is no longer needed.

As a specific illustrative example, each field of array 215, such as field 216, includes two storage cells or bits to hold to binary logical values. As an example, a value of 00 held in field 216 includes a SDN value to indicate line 221 is held in a SDN state, a value of 01 in field 216 includes a recently used value to indicate line 221 is held in a recently used replacement state, and a value of 10 in field 216 includes a not recently used value to indicate line 221 is held in a not recently used state. Here, a value of 11 may not be utilized.

In one embodiment, an LRU algorithm, is biased towards selecting an SDN state cache line for eviction and replacement before a non-recently used state cache line. In other words, streaming data no longer needed is selected for replacement before other data. However, if there is no streaming data no longer needed, then lines may be selected for replacement based on a normal LRU algorithm.

Control logic 210, in one embodiment, is to update replacement states in replacement state fields 215 and to select lines in memory 220 for eviction and replacement. Control logic 210 may include any combination of logic in a processor. For example, control logic 210 includes cache control logic to implement the LRU algorithm. In addition, control logic 210 may also refer to decode logic of a processor to decode operation 205. For instance, decode logic decodes operation 205, masks off field 206, and stores the bit(s) of field 206 in a trace cache entry associated with operation 205. From there, cache control logic obtains the value of field 206 from the trace cache, selects lines for eviction/replacement, and updates replacement state fields, accordingly. As decode logic, a trace cache, and cache control logic includes an extremely specific and purely illustrative example of control logic 210, it can be seen that control logic 210 potentially includes any logic capable of updating array 215 or memory 220 based on operation 205.

As a simplified illustrative example, assume operation 205 includes a load operation, which is to load streaming data held in cache line 221 for an intended last time. As such, a compiler, when compiling code including load operation 205, determines load operation 205 is a last use streaming operation and inserts last use streaming value of 1 in bit 206. When load operation 205 is encountered, control logic 210 searches cache 220. For example, an associative search utilizing address tags identifies line 221 as the cache line holding data referenced by load operation 205. In addition, based on the value of field 206 holding a logical one to indicate load operation 205 is a last use streaming operation, then control logic 210 updates replacement state field 216 to a SDN state. In other words, line 221 is held in a SDN state in response to a last use operation associated with an access to line 221

Note that a last use access may include a first and only access to line 221. As an example, here, if the load is a first and last use access, a cache allocation request associated with the operation may be received by control logic 210. A fill buffer holds a fill buffer entry for the cache allocation request, and when the data for the request is received, a line in cache memory 220 is selected for replacement.

Later, cache control logic 210 receives a cache allocation request and data to fulfill the cache allocation request. As a result, cache control logic 210 is to select a line for replacement. In one embodiment, it is determined if cache memory 220 includes a line that is in a SDN state. Here, replacement fields in array 215 are searched to determine if they hold an SDN state for an associated cache line. If no cache line is held in a SDN state, then a normal LRU algorithm selects a not recently used line for replacement.

When the line is filled, in response to field 206 holding a last use value, corresponding replacement state field 216 is updated to a SDN state value instead of a recently used state value. Therefore, if an operation is a first and a last use load operation, the cache line is held in an SDN state immediately. In contrast, streaming data may be held in line 221 in normal LRU states, until a last use operation accesses line 221.

Figure 3:
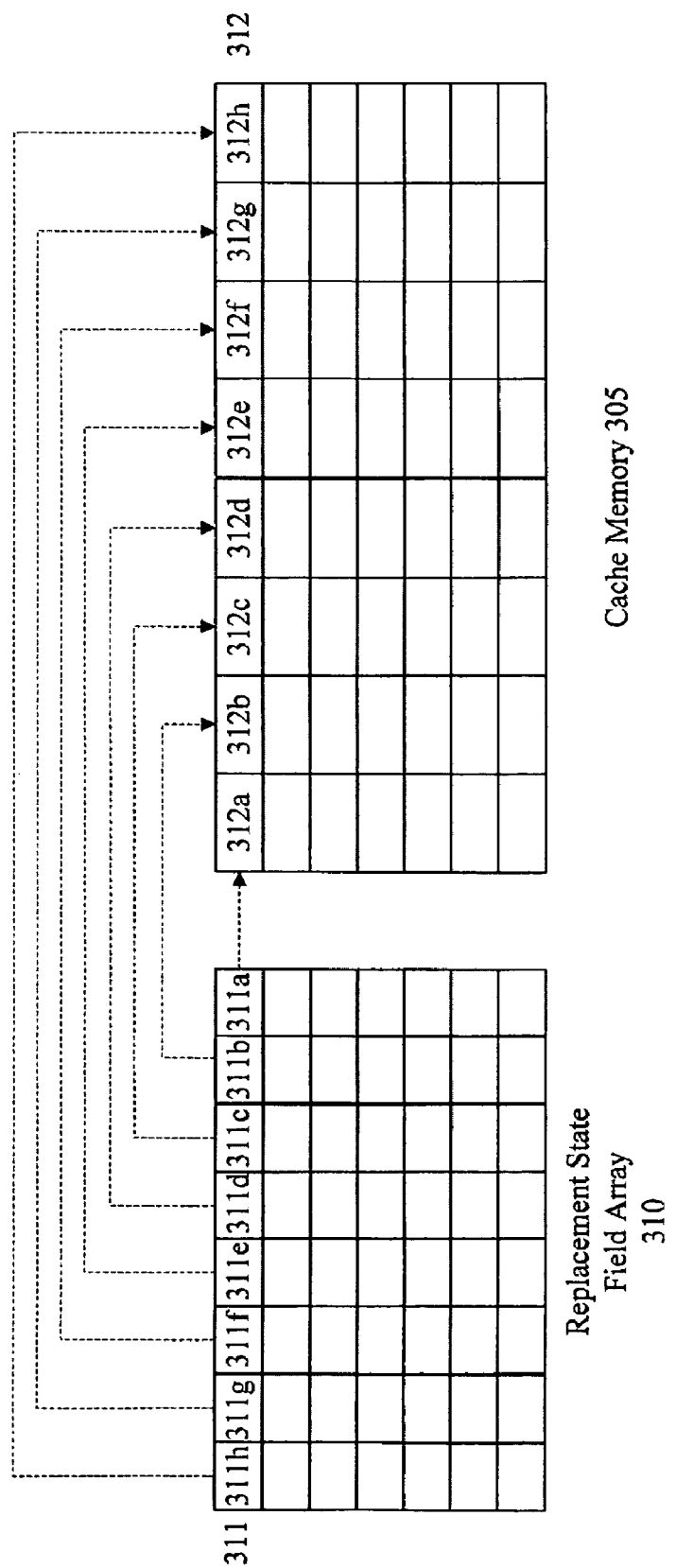
FIG. 3 illustrates an embodiment of an 8-way cache memory associated with a replacement state field array.

Referring to FIG. 3, in one embodiment, cache memory 305 is searched in a specific direction for SDN state lines. For instance, starting in a first way, which holds line 312a, the lines are searched for to determine if a line is held in an SDN replacement state. Here, the first SDN state line encountered is selected for replacement. Note that directional searching is an illustrative example of searching, and may occur in any direction, such as from a higher numbered way back towards lower number ways.

As stated above, in one embodiment, when no SDN state line is found in cache memory 305 through searching replacement state field array 310, then a typical LRU algorithm selects a lines, such as a not recently used line, for replacement.

Figure 4:
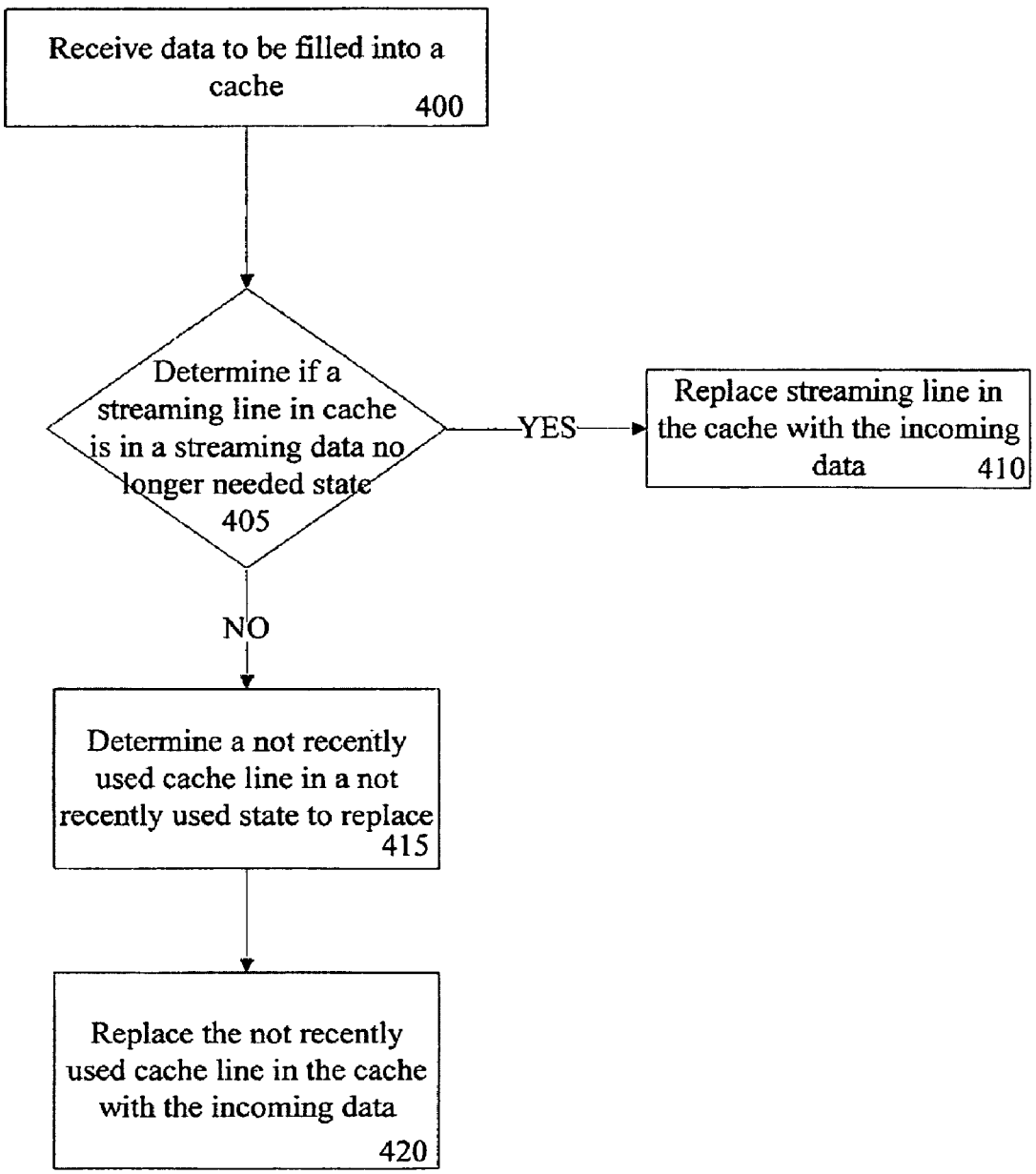
FIG. 4 illustrates an embodiment of a flow diagram for a method of effectively replacing cache lines for streaming and non-streaming data.
Figure 5:
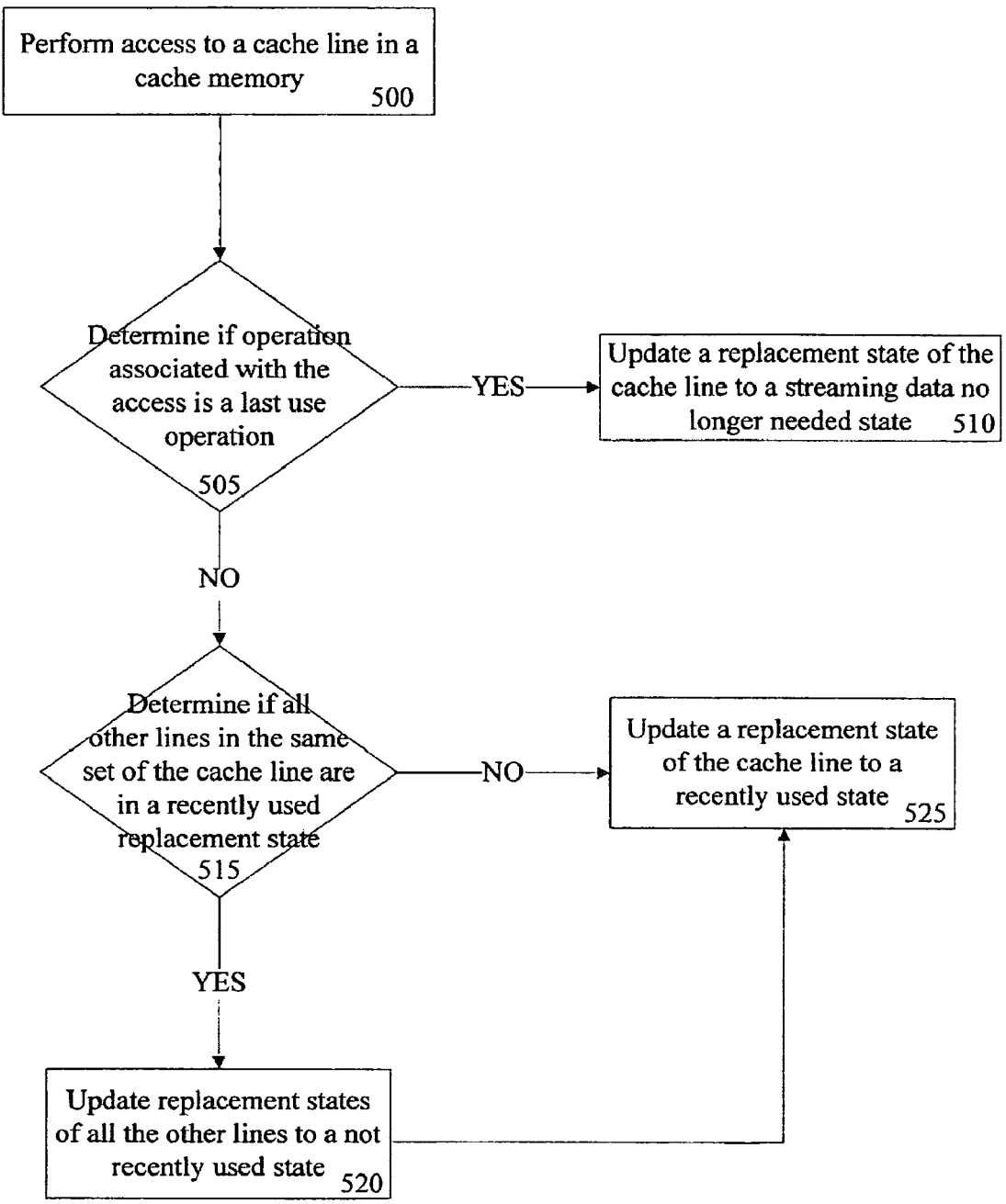
FIG. 5 illustrates an embodiment of a flow diagram for a method of updating replacement states for normal memory access and last use streaming memory access operations.

Referring to FIG. 4, an embodiment of efficiently selecting a cache line for replacement, which is biased towards selecting streaming data no longer needed cache lines, is illustrated. Note that the flows in FIGS. 4 and 5 are illustrated in a substantially serial manner. However, any of the flows may be performed either partially or fully in parallel. Furthermore, the order of the flows is purely illustrative, and any flow is potentially performed in a different order.

In flow 400, data to be filled into a cache is received. As an example, a cache allocation request is received by cache control logic. As a result, a fill buffer entry is created for the request. When the data is retrieved from memory, the data is to be stored in a cache memory. Here, cache control logic determines a line in the cache memory to replace based on a replacement algorithm.

In one embodiment, flows 405-420 includes an embodiment of a Least Recently Used (LRU) algorithm for selecting a cache line to replace. In flow 405, a streaming line held in a streaming data no longer needed (SDN) state is determined. In one embodiment, replacement state fields associated with the cache lines are directionally searched to find the first line in an SDN state. However, any known search method may be utilized to find an SDN state cache line.

If an SDN state cache line is found in the cache memory, then in flow 410, the streaming line in the SDN state is replaced, i.e. the current streaming data no longer needed is evicted, which may include a write-back of the data, and the new data received is filled into the cache line.

In contrast, if no streaming line is found in the cache, then in flow 415, a not recently used cache line in a not recently used state. Any LRU states and searching methods may be utilized to find a cache line in a not recently used state. As above, when a not recently used cache line is found, the received data is filled into the not recently used cache line.

Turning to FIG. 5, an embodiment of a method for updating replacement states of cache lines upon accesses to the cache lines based on types of operations associated with the accesses. In one embodiment, an access to a cache line includes a load from a cache line or a write to the cache line.

In flow 505, it is determined if an operation associated with the access is a last use operation. Often association with an operation includes any known association of performing an access for an operation. In one embodiment, an operation includes a field, such as a non-temporal (NT) field or a last use field. When the NT field holds a first value, such as an NT value or last use value, the operation is determined to be a last use streaming access operation.

If the operation is a last use operation, then a replacement state of the cache line is updated to a streaming data no longer need (SDN) state. In one embodiment, a replacement field associated with the cache line is updated to an SDN value to indicate the associated cache line is in an SDN state.

In contrast, if the operation is not a last use operation, then in flow 515 it is determined if all other lines in the same set as the cache line accessed are in a recently used replacement state. If all of the lines are in a recently used state, then those lines are updated to not recently used states in flow 520. Here, associated replacement state fields may be updated to not recently used values to indicate the cache lines are in a not recently used state. However, either way the accessed cache line is updated to a recently used state in flow 525.

As caching of streaming data is highly efficient for streaming applications, as described above, the benefits of caching streaming data may be realized while efficiently handling the streaming data in the cache to ensure that it doesn't substantially affect Quality of Service to other non-streaming applications sharing the cache. In addition, execution of a single application is not degraded through replacement of potentially needed data with streaming data no longer needed. Software is utilized to identify when streaming data is no longer needed. As a result, complex and expensive hardware logic to predict and identify when streaming data is no longer needed may be avoided. As a result, streaming data no longer needed is selected for first replacement, which allows streaming data to be replaced first instead of other non-streaming data. Consequently, new streaming data will replace no longer needed streaming data instead of replacing non-streaming data.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An article of manufacture including compiler code, which when executed, causes a machine to perform the operations of:
    determining, during compilation of application code an operation in the application code to access streaming data is a non-temporal streaming operation; and
    inserting, during compilation, a non-temporal value in the operation to indicate the operation is a non-temporal streaming operation;
    wherein the operation, when executed, is to cause a machine to perform the operations of: updating a streaming cache line holding the streaming data to a streaming data state in response to the non-temporal value being in the operation and wherein in response to determining a cache line is to be evicted in the machine, the streaming cache line holding the streaming data is to be selected for replacement over a non-streaming cache line in a not recently used state based on a cache replacement algorithm biased towards replacing streaming cache lines over not recently used non-streaming cache lines.

2. The article of manufacture of claim 1, wherein determining the operation is a non-temporal streaming operation includes determining the operation is a last to use operation that is the last operation to access the streaming data for a period, wherein the period is selected from a group consisting of a period of operations, a period of memory access operations, a period of estimated cache accesses, a period of estimated time, and a period of estimated execution cycles.

3. The article of manufacture of claim 1, wherein the operation is a load operation and the non-temporal field includes a non-temporal bit of the load operation.

4. A system comprising:
    a memory to hold application code, the application code including a last use streaming operation, wherein the last use streaming operation includes a non-temporal (NT) field holding a last use streaming value; and
    a processor including a cache, wherein the cache includes a cache line and control logic to update the cache line to a streaming data no longer needed (SDN) state in response to performing an access to the cache line associated with the last use streaming operation based on the NT field included in the last use streaming operation holding the last use streaming value, and wherein the control logic is to implement a replacement algorithm that is biased towards replacing the cache line when in the SDN state over a cache line in a non-streaming, not recently used state.

5. The system of claim 4, wherein the cache line is associated with a replacement state field, the replacement state field to be updated to a SDN value to indicate the cache line is in the SDN state, and wherein the cache line is held in a first array, and wherein the replacement state field is held in a second array, which is separate from the first array.

6. The system of claim 5, wherein the control logic is to update the replacement state field to a recently used state in response to filling the cache line responsive to a cache allocation request associated with a non-last use streaming operation based on a NT field included in the non-last use streaming operation holding a non-last use streaming value.

7. The system of claim 6, wherein the control logic is to update the replacement state field to a not recently used state in response to filling another cache line in the same set as the cache line responsive to a subsequent cache allocation request associated with a subsequent non-last use streaming operation based on a NT field included in the subsequent non-last use streaming operation holding a non-last use streaming value.

8. A method comprising:
    determining, during compilation of application code, an operation in the application code to access streaming data is a non-temporal streaming operation; and
    inserting, during compilation, a non-temporal value in the operation to indicate the operation is a non-temporal streaming operation;

wherein the operation, when executed, is to cause a machine to perform the operations of: updating a streaming cache line holding the streaming data to a streaming data state in response to the non-temporal value being in the operation and wherein in response to determining a cache line is to be evicted in the machine, the streaming cache line holding the streaming data is to be selected for replacement over a non-streaming cache line in a not recently used state based on a cache replacement algorithm biased towards replacing streaming cache lines over not recently used non-streaming cache lines.

9. The method of claim 8, wherein determining the operation is a non-temporal streaming operation includes determining the operation is a last to use operation that is the last operation to access the streaming data for a period, wherein the period is selected from a group consisting of a period of operations, a period of memory access operations, a period of estimated cache accesses, a period of estimated time, and a period of estimated execution cycles.

10. The method of claim 8, wherein the operation is a load operation and the non-temporal field includes a non-temporal bit of the load operation.

* * * * *